Figure 1:
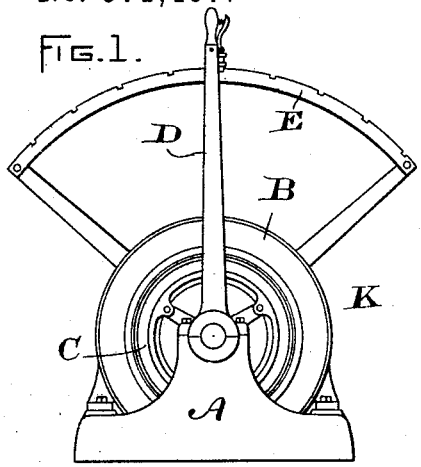

(No Model.) 2 Sheets—Sheet 1.

A. H. ARMSTRONG.
REGULATING POLYPHASE CIRCUITS.

No. 571,467. Patented Nov. 17, 1896.

WITNESSES.
A. H. Abell,
A. F. Macdonald.

INVENTOR.
Albert H. Armstrong, by
Geo. R. Blodgett,
Atty.

(No Model.) 2 Sheets—Sheet 2.

A. H. ARMSTRONG.
REGULATING POLYPHASE CIRCUITS.

No. 571,467. Patented Nov. 17, 1896.

UNITED STATES PATENT OFFICE.

ALBERT H. ARMSTRONG, OF SCHENECTADY, NEW YORK, ASSIGNOR TO THE GENERAL ELECTRIC COMPANY, OF NEW YORK.

REGULATING POLYPHASE CIRCUITS.

SPECIFICATION forming part of Letters Patent No. 571,467, dated November 17, 1896.

Application filed May 2, 1896. Serial No. 589,953. (No model.)

*To all whom it may concern:*

Be it known that I, ALBERT H. ARMSTRONG, a citizen of the United States, residing at Schenectady, in the county of Schenectady, State of New York, have invented certain new and useful Improvements in Regulating Polyphase Circuits, (Case No. 368,) of which the following is a specification.

My invention relates to the regulation of polyphase alternating-current circuits, and particularly to the regulation of induction-motors, in which latter case it finds its greatest utility, and has for its object to provide an improved regulator in which the output of such motors is controlled by variation of position of the moving and stationary parts of the regulator, as more fully described hereinafter, the electric actions depending upon variation of phase relation between the electromotive forces in the coils of the induced member and the line, respectively.

In its broadest aspect my invention comprises both a method of and means for regulating an alternating-current motor, translating device, or circuit of any desired type. In this view it consists in combining with the main electromotive force derived from the generating source another constant electromotive force and then varying the phase relation between the main impressed electromotive force and the constant electromotive force from coincidence of phase to direct opposition. The resultant electromotive force (which may be anything desired, depending upon the relation in magnitude between the impressed and regulating electromotive forces) is utilized in the motor, translating device, or other circuit which is to be regulated.

To the ends pointed out I construct my improved regulator with two windings, a polyphase inducing and induced winding, the inducing-winding being in shunt to the mains, while the induced windings are in series with the work. The voltage of the induced member thus remains substantially constant; but by varying its position with reference to the inducing-coils I change the phase relation between the electromotive force induced in this member and that in the line from coincidence to opposition, so that the full voltage induced may be used either to assist the line-voltage, and thus to raise the counter electromotive force impressed upon the motor, or it may act as a counter electromotive force and cut down the voltage at the motor-terminals, thus regulating their torque, which is proportioned to the square of the impressed electromotive force.

A convenient form in which I have embodied my invention resembles an ordinary induction-motor, the field being in shunt between the lines and the armature being in series in the lines, a suitable controlling-handle being provided by which the position of the armature may be adjusted to the work required. Any convenient way of maintaining the armature and field (using the terms in their ordinary sense) in the adjusted position may be selected.

Figure 2:
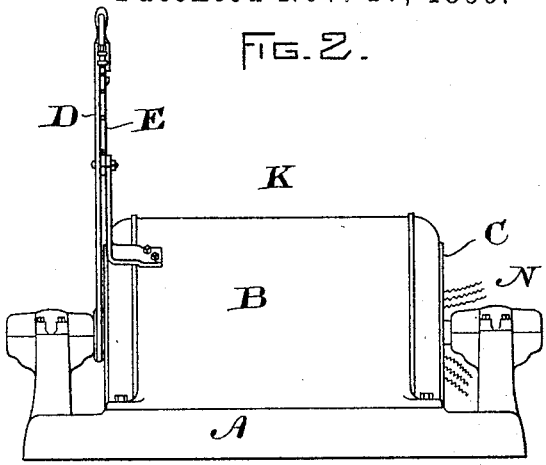
Figure 3:
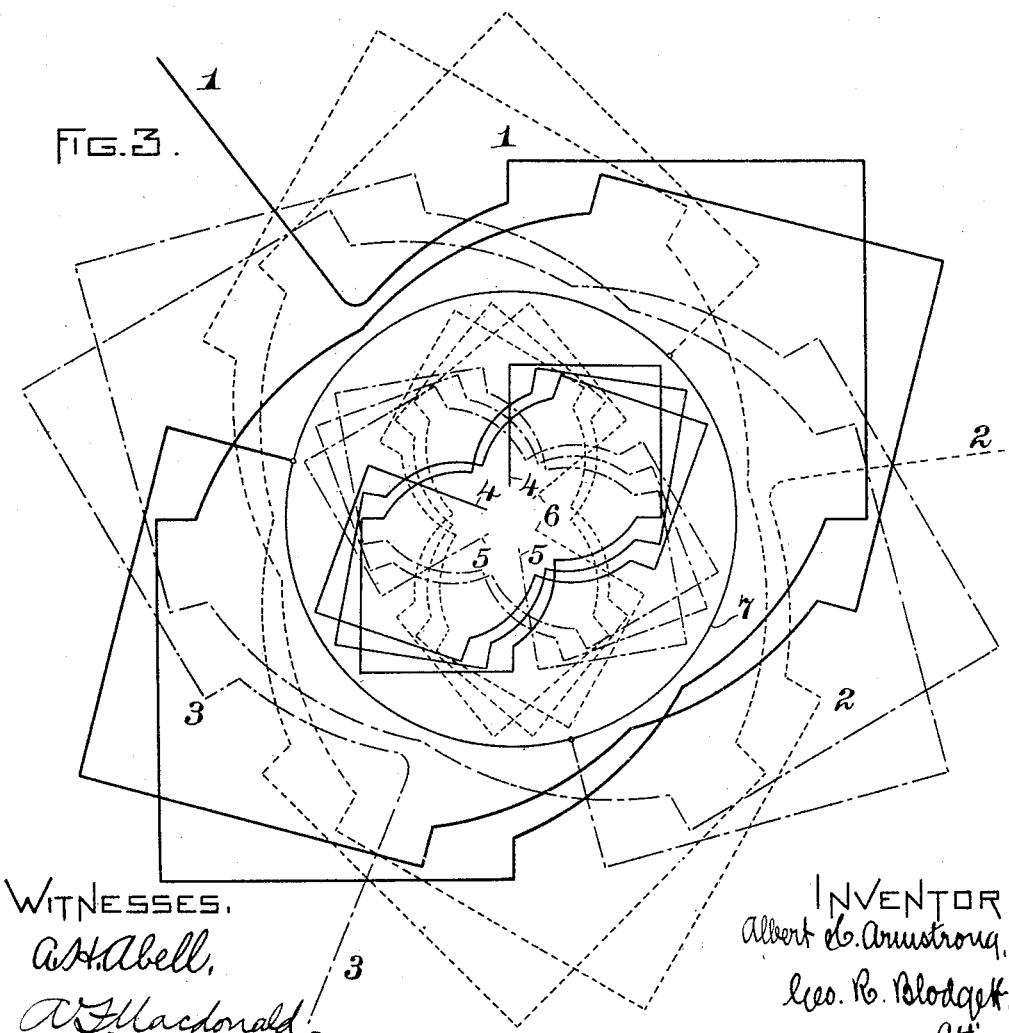
Figure 4:
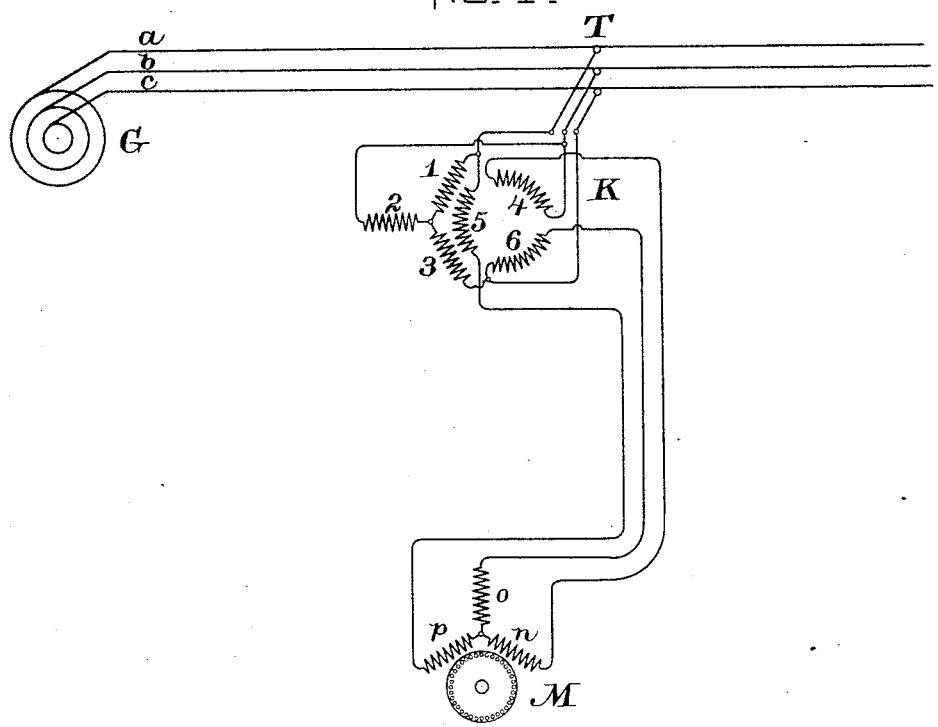
Figure 5:
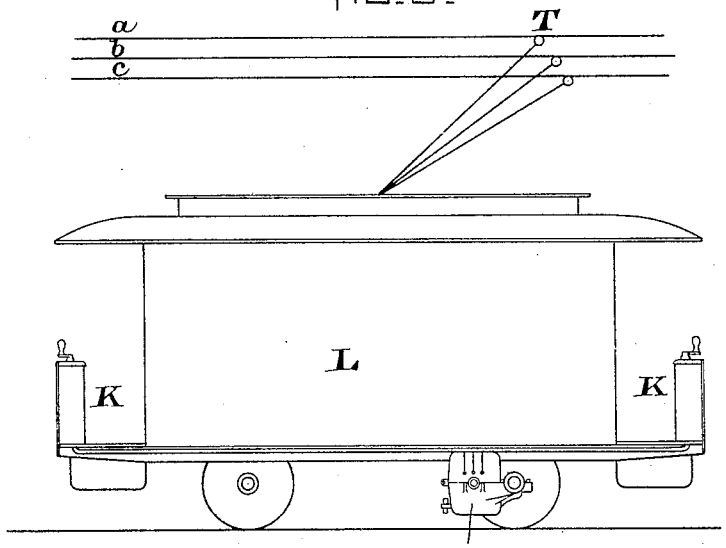

The accompanying drawings show an embodiment of my invention, Figures 1 and 2 being a side and end elevation, respectively, of its mechanical structure, Fig. 3 a diagram of the windings in a three-phase apparatus of the type described, Fig. 4 a diagrammatic illustration showing an electric-railway system with one of my improved regulators in circuit with the motor, and Fig. 5 a diagram of an electric car equipped with my improved regulator.

In Figs. 1 and 2, A is the base of the regulator, B the inducing member or "field," as it is commonly called, and C the induced or regulating member or armature. D is a handle attached to the regulator, working over a sector E. No collecting-rings or similar devices are illustrated (though they might be employed) inasmuch as the connections to the moving member may be readily made by flexible leads. (Shown at N in Fig. 2.)

In Fig. 3 the diagrams of the windings will be readily understood from inspection. A three-phase winding is illustrated, the heavy black line 1 representing one set of coils, the dotted line 2 a second set, and the broken line 3 a third set, all of these being united by the common connection 7 and being situated upon the inducing member. The connections are not illustrated in this figure, but these coils are connected in shunt between the different lines, the whole apparatus being shown as of the three-phase type. The windings of the inner member are of the same type as those upon the armature of an induction-motor, the sets of coils being respectively represented by the solid line 4, the broken line 5, and the dotted line 6. In this case also the connections are not illustrated, but each of the sets of coils is supposed to be in series in one of the mains of the system.

In Fig. 4, G is a generator of three-phase currents sent out over the lines $a\ b\ c$, representing a railway distribution. The regulator K is carried upon the car, and trolleys T are connected with the lines. The coils 4 5 6 are respectively connected in series with the work represented by the motor M, the coil 4 being in series with the coil $n$ upon the motor, the coil 5 with the coil $p$, and the coil 6 with the coil $o$. It is of course intended that these three coils shall be arranged, as in Figs. 1 and 2, upon a rotatable structure, by which their position with reference to the coils 1 2 3 of the inducing member or field may be varied. These latter coils are connected in Y and are in shunt to the mains.

In Fig. 5 I illustrate, diagrammatically, an electric car L, connected by the trolleys T to the mains, provided with controllers K K of the general type just described and a three-phase motor M. With the controller which I have just described may be combined any suitable circuit-breaking arrangement for cutting off the power from the motor or any proper emergency switches or other devices of that class. This forming no part of my present invention may be varied in any desired way without departing therefrom.

My present understanding of the operation of the devices just described is that the phase relation of the electromotive force induced in the series coils with reference to that in the mains is determined by the position of these coils with reference to the coils in shunt to the mains and may be varied by changing the relative position of the induced and inducing coils from coincidence, assisting the electromotive force of the mains to one hundred and eighty degrees difference in phase, opposing this electromotive force.

Assuming that five hundred volts difference of potential existed between the lines and, say, one hundred and fifty could be generated in the series coils, the electromotive force impressed upon the motor might be varied between three hundred and fifty and six hundred and fifty volts, with proportionate change in its torque. In the arrangement of my invention the voltage in the induced member remains constant and the phase relation is the only thing that is changed, whereas in other regulators with which I am acquainted the voltage in the induced member is varied from a maximum in one direction through zero to a maximum in the opposite sense. In other cases the effect has been obtained by varying the flux passing through the induced coil, and it is therefore necessary to provide at the zero position a short-circuited coil cutting down the self-induction of the induced winding, as in this position, though doing no work, it carries full line-current. In the present case, however, the flux is constant and no such coil is necessary, the voltage remaining constant, the only drop in the induced member being that due to its inductance.

What I claim as new, and desire to secure by Letters Patent of the United States, is—

1. The art of regulating a polyphase alternating current motor, translating device, or other circuit, which consists in introducing between the circuit to be controlled and the main source of polyphase electromotive forces intermediate constant electromotive forces, and varying the phase relation between the electromotive forces of the lines and those of the intermediate source from coincidence to opposition, thus impressing upon the motor or other device to be regulated the desired resultant electromotive forces.

2. An alternating-current regulator comprising a polyphase inducing member having interconnected coils or windings in shunt between the mains of the distribution system, an induced member having a core and an independent coil or winding in series between each supply-line and the work, and means for varying the relative angular position of the inducing and induced windings so as to vary the phase relation between the electromotive force of the line and that in the induced member of the regulator.

3. An alternating-current regulator, comprising a fixed inducing member and a rotatably-mounted induced member, the first having a winding in shunt to the lines, and the second a core and a winding comprising an independent coil in series between each of the supply-lines and the work, and a handle for changing the relative angular position of the rotating and fixed members, and thereby the phase relation between electromotive forces in the coils carried upon them.

4. The combination of a generator of alternating current, and lines leading therefrom between which a desired difference of potential is maintained, with a regulator comprising a polyphase inducing member having coils interconnected in shunt between the lines, and an induced member having a core and an independent coil or winding in series between each supply-line and the work, and means for varying the relative positions of the two members so as to change the phase relation between the line electromotive force and the electromotive force of the induced member, and thus regulate the electromotive force impressed upon the working circuit.

5. In combination, a generator of alternating current, lines leading therefrom and supplying an electric railway, a traveling vehicle upon the railway deriving its energy from the lines, a polyphase alternating current motor or motors on the vehicle, and a regulator also carried upon the vehicle, and comprising a polyphase inducing and an induced member, the former connected in shunt between the lines, the latter having a core and an independent coil connected in series between each supply-line and the work, and means for varying the relative position of the windings carried by the two members, and thus impressing upon the motor or motors a resultant electromotive force depending upon the phase relation between the line electromotive force and that in the induced member of the regulator.

In witness whereof I have hereunto set my hand this 28th day of April, 1896.

ALBERT H. ARMSTRONG.

Witnesses:
B. B. HULL,
A. F. MACDONALD.